(12) United States Patent
Harvey

(10) Patent No.: US 7,839,010 B2
(45) Date of Patent: Nov. 23, 2010

(54) GENERATOR DEVICE FOR USE WITH A VENTILATING TURBINE

(76) Inventor: Ellen Harvey, 828 Valleyview Drive, Moose Jaw, SK (CA) S6H 5S2

( * ) Notice: Subject to any disclaimer, the term of this patent is extended or adjusted under 35 U.S.C. 154(b) by 153 days.

(21) Appl. No.: 12/026,991

(22) Filed: Feb. 6, 2008

(65) Prior Publication Data

US 2008/0191489 A1 Aug. 14, 2008

Related U.S. Application Data

(60) Provisional application No. 60/889,567, filed on Feb. 13, 2007.

(51) Int. Cl.
*F03D 9/00* (2006.01)
(52) U.S. Cl. .................................................. 290/55
(58) Field of Classification Search .................. 290/44, 290/55
See application file for complete search history.

(56) References Cited

U.S. PATENT DOCUMENTS

| | | | | |
|---|---|---|---|---|
| 2,004,853 A * | 6/1935 | Crary | ........................... | 415/4.5 |
| 3,707,812 A * | 1/1973 | Roessl | ......................... | 290/55 |
| 4,012,163 A * | 3/1977 | Baumgartner et al. | .... | 415/208.3 |
| 5,743,712 A * | 4/1998 | Aylor | ............................ | 416/42 |
| 6,043,565 A * | 3/2000 | Les Strange | .................. | 290/55 |
| 6,304,002 B1* | 10/2001 | Dehlsen et al. | .............. | 290/1 C |
| 6,713,893 B2* | 3/2004 | van der Horn | ................. | 290/55 |
| 6,798,082 B1* | 9/2004 | Chen | ........................... | 290/55 |
| 2005/0269822 A1* | 12/2005 | Kinpara et al. | ............. | 290/40 C |
| 2007/0210585 A1* | 9/2007 | Korner | ......................... | 290/55 |
| 2008/0265584 A1* | 10/2008 | Teng | ............................ | 290/55 |
| 2009/0184520 A1* | 7/2009 | Hsieh | ........................... | 290/55 |

FOREIGN PATENT DOCUMENTS

| | | | | |
|---|---|---|---|---|
| CA | 2420491 A1 | * | 8/2004 | |
| DE | 2951085 A | * | 6/1981 | |
| JP | 2003222071 A | * | 8/2003 | |
| JP | 2005083207 A | * | 3/2005 | |
| WO | WO 2006138747 A2 | * | 12/2006 | |

\* cited by examiner

*Primary Examiner*—Joseph Waks
(74) *Attorney, Agent, or Firm*—Ryan W. Dupuis; Kyle R. Satterthwaite; Ade & Company Inc.

(57) ABSTRACT

A generator device is arranged for use with a roof ventilator including a base arranged to be supported in a roof opening in a roof and a ventilating turbine rotatably supported on the base so as to be arranged for ventilating a space below the roof through the roof opening when rotated. The generator device includes a generator having an input shaft and being arranged to produce electricity when the input shaft is rotated and a coupling mechanism arranged to couple the input shaft of the generator to the turbine. A roof top ventilating turbine can thus be readily converted for capturing wind energy at low cost using existing equipment.

12 Claims, 6 Drawing Sheets

GENERATOR DEVICE FOR USE WITH A VENTILATING TURBINE

This application claims the benefit under 35 U.S.C. 119(e) of U.S. provisional application Ser. No. 60/889,567, filed Feb. 13, 2007.

FIELD OF THE INVENTION

The present invention relates to a generator device for producing electricity and more particularly, the present invention relates to a generator device arranged to be coupled with a rooftop ventilating turbine to produce electricity when the rooftop ventilating turbine is rotated by wind.

BACKGROUND

With increasing concern for the environment, there is an increasing need for sources of energy which do not cause pollution, for example the harvesting of wind energy. Use of wind turbines to produce energy by driving a generator is known, however known systems typically require large costly turbines to be supported on large towers which are generally costly to install. Furthermore effective designs of turbines for harvesting wind energy on a large scale are generally considered to be visually unappealing in an urban environment.

SUMMARY OF THE INVENTION

According to one aspect of the invention there is provided a generator device for use with a ventilator for a roof, the ventilator comprising a base arranged to be supported in a roof opening in the roof and a ventilating turbine rotatably supported on the base for ventilating a space below the roof through the roof opening when rotated, the device comprising:

a generator having an input shaft and being arranged to produce electricity when the input shaft is rotated; and a coupling mechanism arranged to couple the input shaft of the generator to the turbine.

The device according to the present invention allows a roof top ventilating turbine to be readily converted for capturing wind energy at low cost using existing equipment.

The coupling mechanism may comprise at least one wheel arranged to be rotatably supported on the base for rolling engagement with the turbine as the turbine rotates.

The wheels may be supported on an inner side of a peripheral wall of the base and may communicate through an opening in the peripheral wall for engagement with the turbine.

Preferably the wheels are circumferentially spaced positions about the base and each wheel drives a respective generator. Accordingly, each generator is preferably supported on the base such that the generators are circumferentially spaced about the base.

At least some of the generators may be arranged to be coupled to the turbine so as to have a different turning ratio relative to the turbine in relation to other ones of the generators for responding to different wind conditions. This may be accomplished by arranging some of the wheels to be different in size from other ones of the wheels. Alternatively, the wheels may be the same diameter, but some of the generators are coupled to the respective wheels with different turning ratios.

In some embodiments, some of the generators have a higher amperage capacity than other ones of the generators such that some generators would have less capacity to produce electricity than other ones of the generators.

Some of the wheels may be arranged to be selectively disengaged from the turbine during operation thereof in response to reduced wind speed.

There may be provided an annular member arranged to be supported on the turbine for rotation therewith upon which the wheels are arranged to be engaged, in which the annular member has a surface with a higher coefficient of friction than the original turbine.

The coupling mechanism preferably includes a gear reduction between rotation of the turbine and the input shaft of the generator.

The coupling mechanism may comprise a shaft arranged to be fixed to the turbine for rotation therewith and which is arranged to be connected to the input shaft of the generator. In this instance, the shaft preferably has a stepped diameter which reduces from an upper portion to a lower portion to define a shoulder between the upper and lower portions for engagement with a thrust bearing supported on the base to rotatably support the turbine on the base.

In preferred arrangements, the device is provided in combination with a ventilator having a base supported in a roof opening in a roof and a ventilating turbine rotatably supported thereon so as to ventilate a space below the roof through the tubular base in the roof opening receiving the base therethrough.

According to a second aspect of the present invention there is provided a generator device in combination with a ventilator for a roof, the ventilator comprising a tubular base arranged to be supported in a roof opening in a roof and a ventilating turbine rotatably supported on the base and being driven to rotate by wind so as to be arranged for ventilating a space below the roof through the tubular base in the roof opening when the ventilating turbine is rotated, the generator device comprising:

at least one generator having an input shaft and being arranged to produce electricity when the input shaft is rotated; and a coupling mechanism arranged to couple the input shaft of the generator to the turbine.

The generator preferably comprises a plurality of generators supported circumferentially about the tubular base of the ventilator such that the coupling mechanism comprises a wheel coupled to the input shaft of each generator for rotation therewith and a generator control associated with each generator and such that each generator control operates the respective generator between an engaged position in which the respective wheel engages the ventilating turbine such that rotation of the turbine relative to the base drives rotation of the respective generator and a disengaged position in which the respective generator is disengaged from being driven by rotation of the turbine relative to the base.

The generator controls preferably independently operate the respective generators between the engaged and disengaged positions thereof responsive to wind force as measured by a wind force gauge.

Preferably the generator controls are arranged to engage the respective generators into the engaged position sequentially with increasing wind force as measured by the wind force gauge.

According to another aspect of the present invention there is provided a generator device comprising:

a tubular base;

a turbine rotatably supported on the base and being driven to rotate by wind;

a plurality of generators supported circumferentially about the tubular base; each generator having an input shaft and being arranged to produce electricity when the input shaft is rotated;

a wheel coupled to the input shaft of each generator for rotation therewith;

a generator control associated with each generator;

each generator control being arranged to operate the respective generator between an engaged position in which the respective wheel engages the turbine such that rotation of the turbine relative to the base drives rotation of the respective generator and a disengaged position in which the respective generator is disengaged from being driven by rotation of the turbine relative to the base;

the generator controls being arranged to independently operate the respective generators between the engaged and disengaged positions thereof responsive to wind force as measured by a wind force gauge.

Some embodiments of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
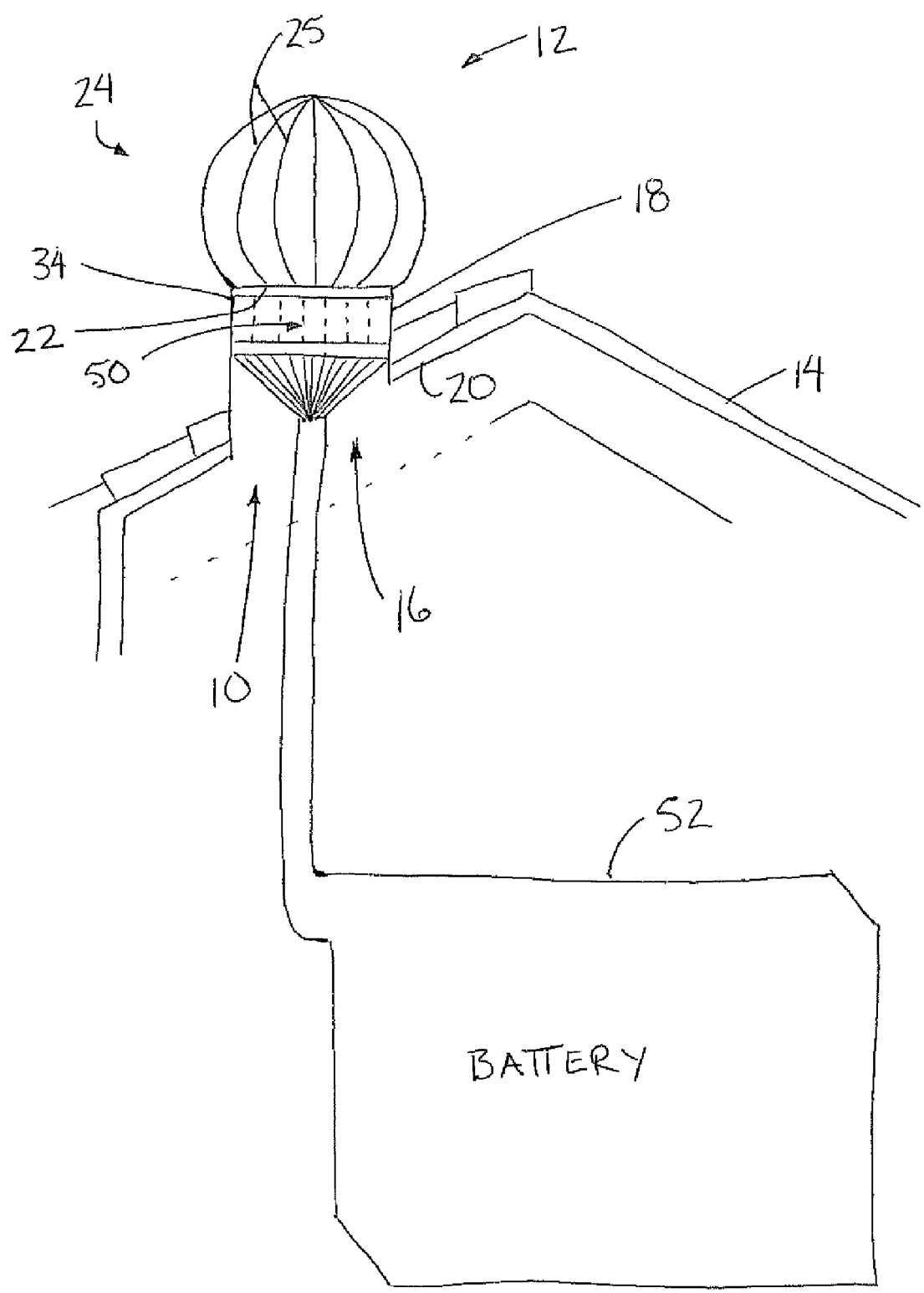
FIG. 1 is a partly sectional elevational view of the device connected to a ventilator on a roof top.
Figure 2:
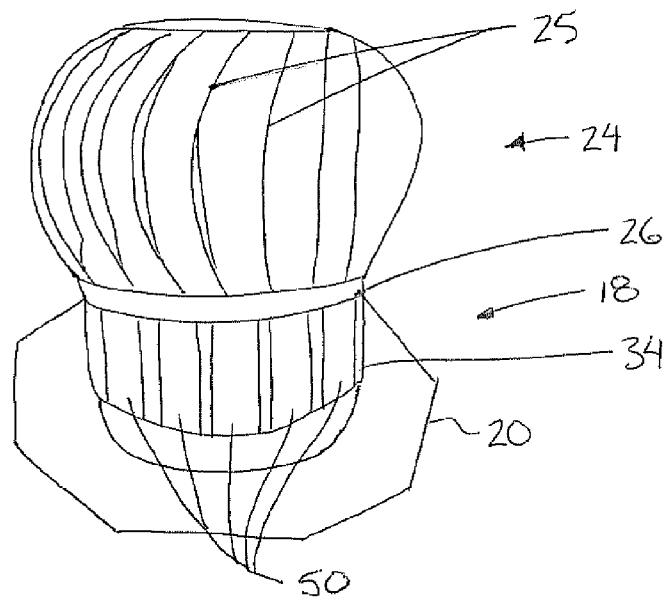
FIG. 2 is a perspective view of a roof top ventilator upon which the generator device has been installed.
Figure 3:
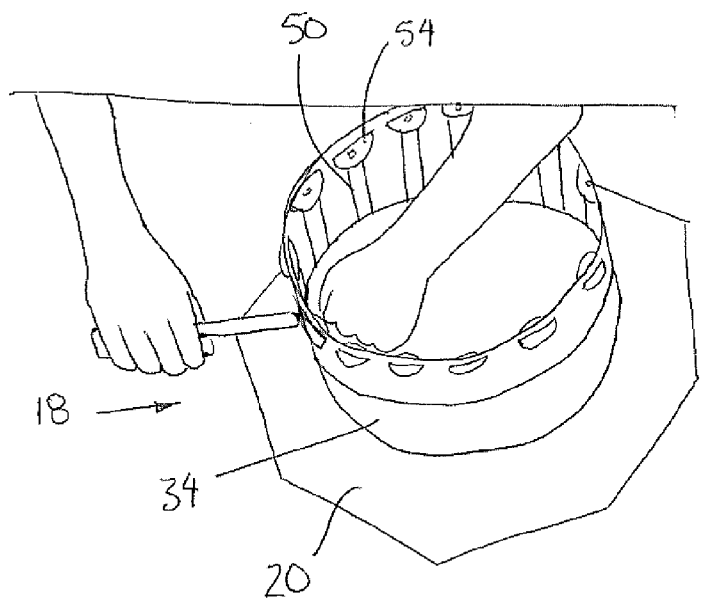
FIG. 3 is an overhead view of a roof top ventilator base illustrating installation of the generator device thereon.
Figure 4:
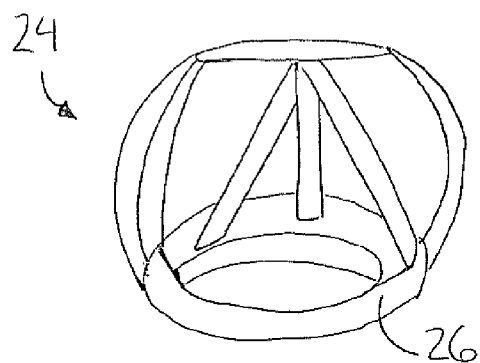
FIG. 4 is an internal view of the turbine of the roof top ventilator including readjusted frame supports.
Figure 5:
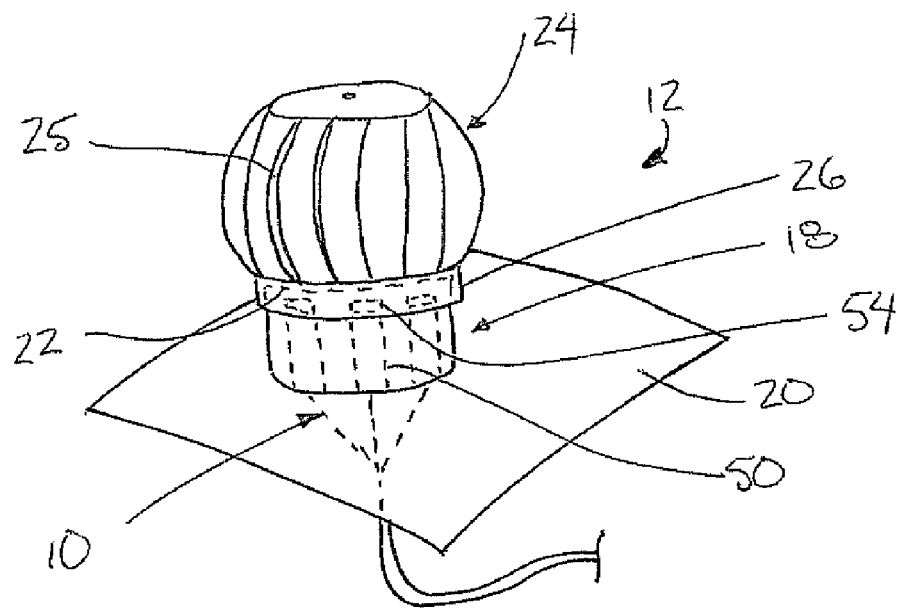
FIG. 5 is a perspective view of the roof top ventilator with the generator device installed thereon.
Figure 6:
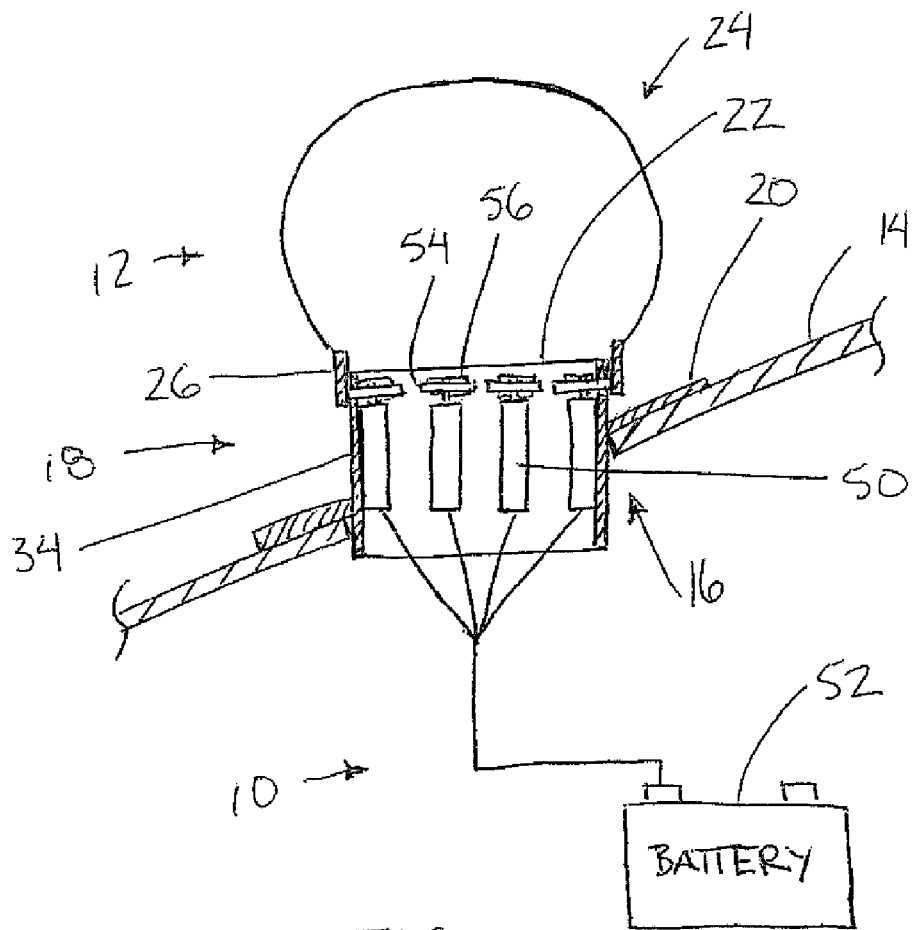
FIG. 6 is a partly sectional elevational view of the generator device.
Figure 7:
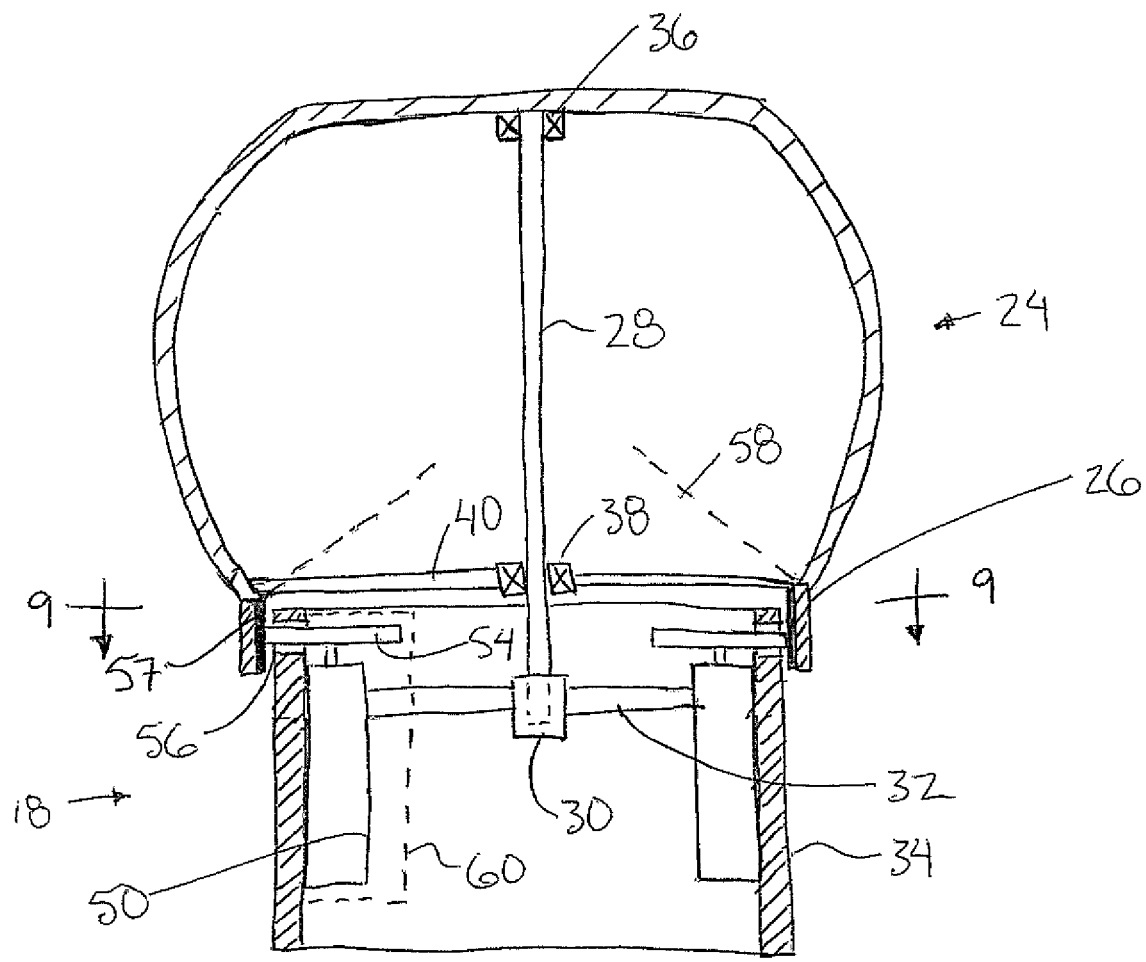
FIG. 7 is an enlarged sectional view of the roof top ventilator upon which some components of the generator device are shown installed.
Figure 8:
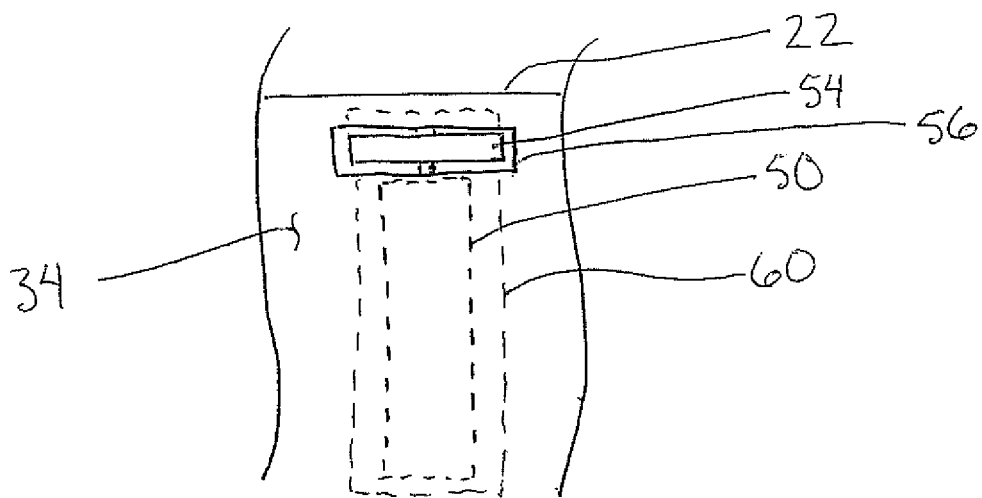
FIG. 8 is an exterior elevational view of a portion of the roof top ventilator base when the turbine is removed therefrom.
Figure 9:
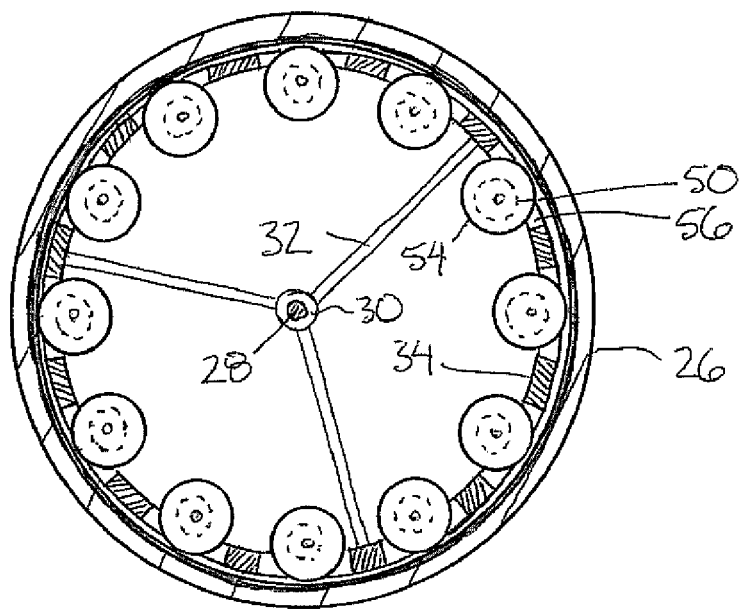
FIG. 9 is a sectional view along the line 9-9 of the FIG. 7.

Referring to the accompanying figures there is illustrated a generator device generally indicated by reference numeral 10. The device 10 is particularly suited for use with a roof top mounted ventilator 12 of the type which is typically used for mounting on a roof 14 of a building for communication through a roof opening 16 therein.

The ventilator 12 includes a tubular base 18 in the form of a cylindrical sleeve which is received through the roof opening 16 and which supports a sealing flange 20 spanning radially outwardly therefrom at a perimeter of the sleeve for sealing engagement with the surrounding roof. An upper edge 22 of the cylindrical sleeve forming the base 18 is overlapped by a ventilating turbine 24 which is rotatably supported on the base 18 which is fixedly supported on the roof top. The turbine 24 comprises a barrel shaped member having a plurality of vanes 25 about the circumference thereof which are oriented to capture wind to drive rotation of the turbine in response to a horizontal wind blowing across the turbine. The vanes 25 also function to draw a ventilating air current through the tubular base 18 for ventilating the space below the roof.

The turbine 24 includes a cylindrical collar 26 at the base thereof which is slightly larger in diameter than the sleeve forming the base 18 for overlapping the upper edge 22 of the base as it extends downwardly over the base about a full periphery of the base. A domed enclosure is formed above the collar 26 with slotted openings therein in alignment with the respective vanes 25 to form a plurality of scoops which gather the wind and drive rotation of the turbine. The vanes 25 are oriented in a common direction of rotation in relation to the central axis of rotation of the turbine.

The turbine 24 is supported on a central shaft 28 which is received within a cup 30 at the bottom end of the shaft which is supported in fixed relation to the base 18 by a plurality of spokes 32 fixedly spanning between the cup 30 supporting the shaft therein on the peripheral wall 34 of the base. The turbine is rotatably supported on the shaft by a top bearing 36 rotatably receiving the top end of the shaft therein at the top end of the domed enclosure forming the turbine. A central bearing 38 is rotatably supported about the shaft to locate the shaft centrally in relation to the cylindrical collar 26 of the turbine by a plurality of respective spokes 40 spanning between the central bearing 38 and the collar 26.

Although various embodiments of the present invention are shown and described herein, in general in all embodiments, the device 10 comprises a coupling mechanism arranged to be coupled between rotation of the turbine and at least one generator 50 having an input shaft rotated by the coupling mechanism in response to rotation of the turbine to produce electrical power at the generator which charges a battery 52 connected thereto. Electrical power generated by the generators 50 and stored in the battery 52 can then be used as supplemental power to homes and other buildings and the like.

Turning now more particularly to FIGS. 1 through 9, a first embodiment of the device 10 will now be described in further detail. In this instance a plurality of the generators 50 are provided at circumferentially spaced positions about the base 18 of the ventilator. Each generator comprises a housing which is generally cylindrical in shape having dimensions which are narrow in diameter while being generally elongate in height to span substantially a height of the base 18. The generators are supported on an inner side of the peripheral wall 34 of the base. The input shaft at the top end of each generator mounts a wheel 54 thereon which is arranged for selective engagement with the turbine to rotate the wheel and the input shaft upon which it is supported for driving the respective generators 50.

The upper edge of the sleeve forming the base 18 of the ventilator includes a plurality of cut-outs or openings 56 formed therein at circumferentially spaced positions about the sleeve of the base for alignment with the wheels 54 respectively. Each opening includes a bottom edge which is spaced downwardly from the upper edge of the base while a portion of the base spans above the opening 56 to define a continuous peripheral rim on the base above the openings 56 spaced therebelow.

Each generator includes an integral gear reduction coupling the input shaft to the driven components of the generator. Each generator further includes a clutch mechanism which operates the respective wheel 54 for selectively disengaging the wheel 54 either from the turbine or from the generator as required. The clutches which control each of the respective generators and engagement of the respective wheels permit some of the wheels and respective generators to be disengaged responsive to low velocity rotations of the turbine resulting from low wind speeds so as to operate the turbine at the greatest efficiency. Furthermore the ventilator is arranged to be permitted to continue to perform its ventilating function.

The device according to the first embodiment further includes an annular member 57 which is arranged to be supported within the cylindrical collar 26 to line the collar with a material having a high coefficient of friction on its surface which is engaged by the wheels 54 to ensure good frictional contact between the periphery of the wheels and the turbine, thereby preventing any relative slippage therebetween.

The device further includes a shield 58 which is supported annularly within the interior of the domes portion of the turbine in the form of a wall which projects radially inwardly and upwardly from the collar 26 to provide a roof which spans overtop of the circumferentially spaced generators therebelow and to accordingly protect the generators from the elements. The electrical power outputs of all of the generators are connected commonly to the battery 52.

In further embodiments the wheels 54 may have different diameters or different power ratings of generators may be provided, or yet further different gearing ratios may be provided between the wheels and the respective generators so that a turning ratio of some of the generators relative to the turbine is different than others so that generators having the most desirable turning ratio relative to the turbine can be selected to be engaged with the turbine for a particular wind speed while the other remaining generators may optionally be disengaged for optimal efficiency. Engagement and disengagement of the wheels can also be controlled remotely.

Figure 10:
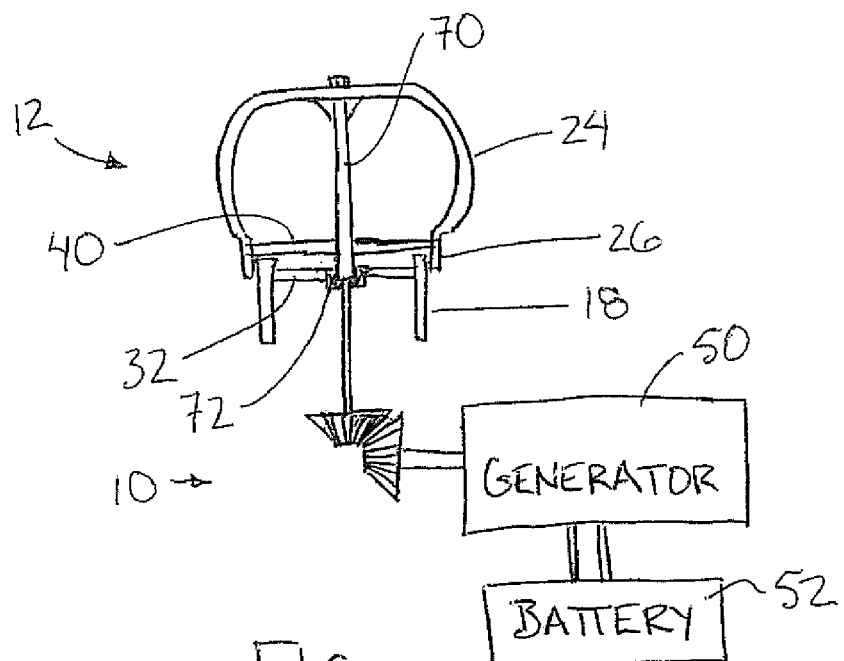
FIG. 10 is a schematic representation of a further embodiment of the generator device.

In a further embodiment shown schematically in FIG. 10, a replacement shaft 70 may be provided which is fixed for rotation with the turbine relative to the base. The spokes spanning between the shaft and the collar of the turbine are accordingly fixed relative to the shaft and turbine, and the shaft is instead rotatably supported within the cup connected to the base of the ventilator by respective spokes. The shaft in this instance preferably has a stepped diameter which reduces from an upper portion having a first prescribed diameter to a lower portion having a second prescribed diameter which is less than the first prescribed diameter. The shoulder formed between the upper and lower portions thus defines an annular end face which is engaged upon a thrust bearing 72 which carries the weight of the turbine thereon for rotatably supporting the turbine on the base. The lower portion of the shaft can thus be extended in length to extend downwardly into a roof opening where the replacement shaft can be connected directly to the input shaft of the generator for producing electrical power which is fed to the battery 52 as in the previous embodiment.

The device described herein can be used to produce electricity for all types of uses. The electricity produced would be fed to and stored in batteries which could be used to subsidize the present commercial source, for use in general for appliance, equipment for tools and in particular for emergency backup use in the event or prolonged periods of commercial power outages. As few people at present have any backup sources of electricity, it would protect both them and their plumbing by maintaining furnace function during cold weather commercial source outages. It would also keep freezers, fridges and air conditioners operating during heat waves, thereby protecting food from spoiling and people from possibly heat exhaustion or stroke during prolonged outages of commercial electricity.

The device 10 described herein makes use of alternators and or generators ranging in amperage from 1 to 1500 or more, which are permanently attached but adjustable to the upper inside circumference of the roof top turbine housing. Cut outs in the housing provide an opportunity for wheels attached to respective drive shafts to protrude through the housing and make contact with the rotating inside base of the turbine. The inside base can be modified to accommodate increased traction by adding a ½ to 4 inch wide continuous band over the frame support. The supporting frames may be repositioned upwards if this proves to be more advantageous. The alternators and/or generators will be equipped with remote control devices making it possible to employ them according to wind velocity; that is fewer would be engaged during low velocity periods while all may be employed during high velocity periods.

In the second embodiment when providing a replacement shaft, the shaft diameter may be reduced in the order of $1/16$ to ¼ of an inch to allow the support bearing to support the shaft while still allowing the smaller diameter lower portion to pass through and be utilized by an alternator generator therebelow. In this instance, the typical 10 inch shaft provided on a commercially available and conventional design of roof top ventilator, can be replaced with varying lengths of shafts, possibly up to 36 inches in length, to accommodate the alternator or generator utilization of same. An auxiliary drive wheel may also be supported on the replacement shaft for driving the generator. The amperage of either will be in accordance to the customer's preference and based on the average wind velocity in their area along with their electrical versus ventilation operations.

When fixing the shaft to the turbine, the top end of the shaft may be secured to the top of the turbine through a hole made in the center of the turbine just large enough for the shaft to pass through. A threaded top of the shaft will be left exposed to accommodate a securing bolt. The shaft will be inserted into the top of the turbine matching the securing apparatus to the inside of the housing for subsequent riveting, studding or bolting in place. The shaft can also be welded to the turbine when it is certain that the shaft and turbine rotate perfectly together.

When providing cut outs in the base for receiving a plurality of wheels at circumferentially spaced positions therethrough, the cut outs or openings are preferably provided within a range of approximately $13/16$ of an inch or wider. The cut outs will be of various lengths to accommodate differing alternator or generator drive shaft wheels passing from the inside therethrough to outside to make contact with the rotating turbines overhanging collar which overlaps in the order of $13/16$ of an inch or wider if modified such that the openings are accordingly located in alignment with the overlapped portion of the collar of the turbine.

Each alternator or generator has a metal and or plastic housing which protects them from the weather, especially the moving components thereof. The housings 60 form an enclosure on three sides of the respective generator while the peripheral wall of the base forms the remaining side to full enclose and protect the generator therein.

The material having a high coefficient of friction formed in an annular member is secured along the inner surface of the collar of the turbine which overlaps the base by $13/16$ of an inch or wider if modified. The annular member is made of an efficient tracking material, for example possibly scored aluminum. It will extend upward far enough to clear the top of the housing, then be bent to angle towards the center of the housing to the extent necessary to completely roof the alternators/generators. As there is a half inch space between the housing and the rotating turbine, the strut support of the additional tracking band and roof member will be sufficiently deep enough to allow drainage for any moisture that might otherwise accumulate. All different sizes of rooftop ventilators can be modified in the same way from thin diameters of 18 to 36 inches for example, or larger such as commercial building rooftop ventilators, etc. Infinitely larger sizes of ventilator type turbines can be supported separately from a roof top on a windmill type support or tower for example.

A much larger generator turbine could be produced measuring up to 100 meters in diameter or more. These would be mounted on a cement or steel supported platform. Utilizing the same general design, principles and spirit of the afore explained, but on a much bigger scale, a much large alternator/generator turbine would be produced measuring 100 meters in diameter or more. Personal or commercial buildings could be constructed beneath same, with the option of incorporating some or all of the supporting pillars in their structure. These would accommodate alternators or generators of much greater amperage capacity.

Figure 11:
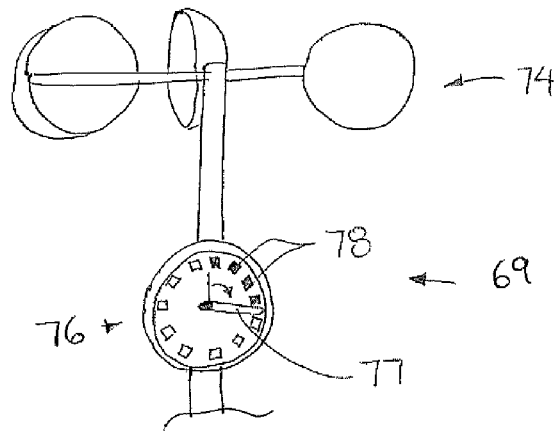
FIG. 11 is a schematic representation of an anemometer for controlling the device.
Figure 12:
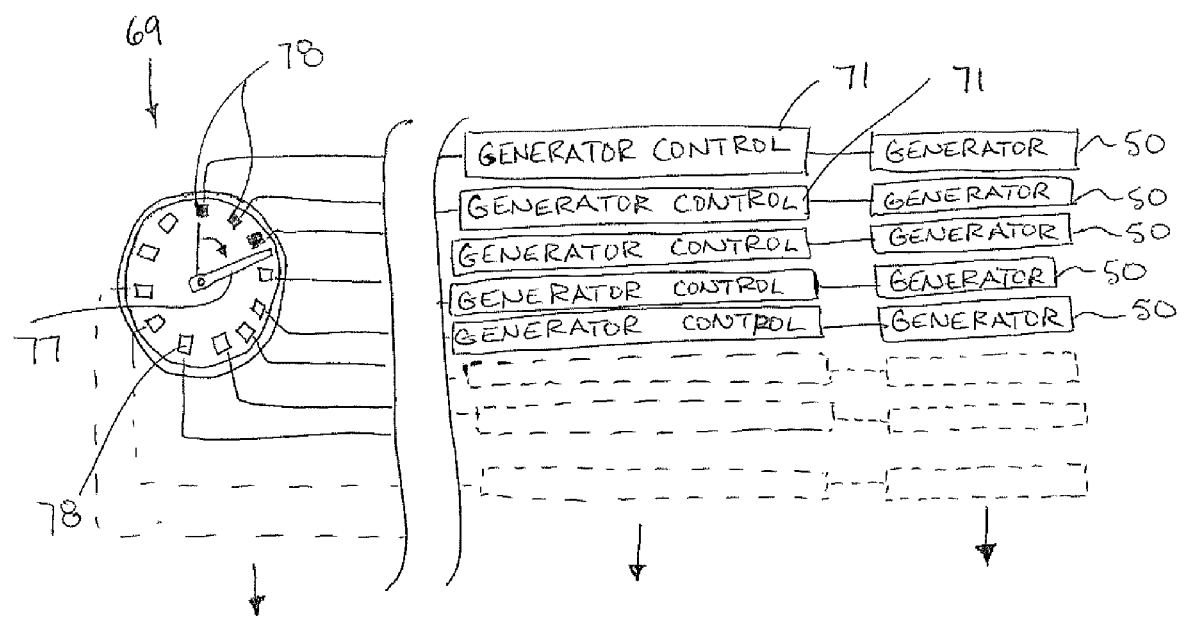
FIG. 12 is a schematic representation of a connection between the anemometer and the generators.

Turning now more particularly to FIGS. 11 and 12, according to a further embodiment of the device 10, an anemometer or wind force gauge 69 is provided with a plurality of generator controls 71 for controlling the generators 50 according to the first embodiment of FIGS. 1 through 9.

When providing a plurality of generators 50 which are supported circumferentially about the peripheral wall 34 of the base 18 as in the embodiment of FIGS. 1 through 9, a preferred control and coupling mechanism between the generators and the turbine 24 comprises one of the generator controls 71 being associated with each generator for controlling engagement and disengagement of the respective wheel 54 of the generator with the annular member 57 on the turbine upon which the wheel rotates when engaged.

Each control 71 operates the respective generator independently of the other generators for displacing the generator and the wheel supported thereon relative to the base 18 between an engaged position in which the wheel engages the ventilating turbines such that the rotation of the turbine relative to the base drives rotation of the respective generator and a disengaged position in which the respective generator is disengaged from being driven by rotation of the turbine relative to the base. Each generator is thus supported on the base to be moveable relative to the base and the turbine rotatably supported thereon. A suitable spring mechanism biases the generator into the disengaged position while a suitable motor is provided for displacing the respective generator into the engaged position upon actuation thereof by the respective generator control.

Initially all of the generators are in the disengaged position when there is zero wind force as measured by the wind force gauge 69. The generator controls are arranged to be responsive to the wind force gauge to displace the generators into the engaged position responsive to increasing wind force as measured by the wind force gauge. At least some of the generator controls are responsive to different wind forces than other ones of the controls so that more generators are engaged with the turbine when the wind force is greater than when the wind force is reduced.

In a preferred operation, each generator control is operable to displace the respective generator into the engaged position responsive to a wind force measured by the wind force gauge which is greater than a previous one of the generator controls so that with increasing wind force from zero force to a prescribed maximum force, all of the generators are sequentially displaced into the engaged position from the disengaged position. Similarly when the wind force decreases from the prescribed maximum to zero, all of the generators would accordingly be sequentially displaced into the disengaged position.

As shown in FIGS. 11 and 12, the wind force gauge 69 comprises an anemometer having a rotating portion 74 which rotates responsive to wind forces to increase its speed of rotation with increasing wind force. The anemometer or wind force gauge 69 also includes an output in the form of a dial 76 having a needle 77 rotatably supported thereon which increases in angular deflection from a starting point with increasing wind force measured by the gauge. A plurality of switches 78 are supported circumferentially about the dial for sequential engagement by the needle 77 from the starting point as the wind force gradually increases. As the needle 77 passes any one of the switches 78, the switch activates the associated generator control to actuate the associated generator into the engaged position. As the needle passes the switch again upon return to a zero indication on the dial of zero wind force, the switch causes the associated generator control to return the generator to the disengaged position. Each of the circumferentially positioned switches 78 corresponds with a respective one of the generator controls to operate a respective one of the generators 50.

As described herein, the anemometer measures wind force, or speed. As described herein, electric switches have been placed on the dial face, which the hand, or needle, switches on as it passes. When the velocity drops below this reading, the needle reverses, turning the switch off as it passes.

Each anemometer would be equipped with as many switches as necessary, to maximize the output of each generator. The dial face would be enlarged and the needle extended, to accommodate the number of generators being serviced.

Turbines, much larger than roof top ventilators, would have many more generators and therefore require many more switches.

Each switch turns on the electric supply to one or more motorized components; which, in turn, provides sufficient force to move the generator, or generators, to the exact degree required, to engage its drive shaft wheel with the spinning turbine track. It then holds it at this precise position. When the needle switches the electricity off, the motorized component stops exerting force to the generator. A stationary spring affixed between the generator, on the inside wall of the turbine housing, aids in the immediate return the generator to its neutral position.

The various generators are thereby engaged and disengaged, according to the velocity that this electric supply switch is set at. This totally automates the system, maximizing all of the generators electrical output continuously.

In some embodiments, some of the generators are have a higher amperage capacity than other ones of the generators such that some generators would have less capacity to produce electricity than other ones of the generators.

In other embodiments, a very large generator device could be built according to the same design as the above but on a much larger scale, to be mounted on a cement or steel supported platform to maximize the capture of wind energy at low operating expense. In this instance, an infinitely larger duplicate generator would be comprised of a base supported on an elevated platform and a turbine rotatably supported on the base. The generator device comprises alternators or generators having an input shaft and being arranged to produce electricity when the input shaft is rotated and a coupling mechanism arranged to couple the input shaft of the alternators or generators to the turbine thus capturing wind energy at low operating expense. Generator devices which are built on an infinitely larger scale can be arranged for the sole purpose of maximizing the harvesting of wind produced electricity. All parts of the device described herein could be reproduced on an infinitely larger scale produce an infinity larger alternator/generator turbine to be mounted on an elevated platform.

It is understood when referring to generators herein, that any form of generator or alternator can be used which generates electricity responsive to a mechanical input, typically in the form of a rotating shaft.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A generator device for use with a ventilator for a roof, the ventilator comprising a base arranged to be supported in a roof opening in the roof and a ventilating turbine rotatably supported on the base for ventilating a space below the roof through the roof opening when rotated, the device comprising:
 a plurality of generators, each having an input shaft and being arranged to produce electricity when the input shaft is rotated; and
 a coupling mechanism arranged to couple the input shafts of the generators to the turbine;
 the coupling mechanism comprising a plurality of wheels at circumferentially spaced positions about the base such that each wheel is associated with a respective one of the plurality of generators, each wheel being arranged to be rotatably supported on the base for rolling engagement with the turbine as the turbine rotates;
 wherein at least some of the generators are arranged to be coupled to the turbine so as to have a different turning ratio relative to the turbine in relation to other ones of the generators.

2. The device according to claim 1 wherein at least said one wheel is supported on an inner side of a peripheral wall of the base and communicates through an opening in the peripheral wall for engagement with the turbine.

3. The device according to claim 1 wherein each generator is supported on the base such that the generators are circumferentially spaced about the base.

4. The device according to claim 1 wherein some of the wheels are different in size from other ones of the wheels.

5. The device according to claim 1 wherein some of the generators are have a higher amperage capacity than other ones of the generators such that some generators would have less capacity to produce electricity than other ones of the generators.

6. The device according to claim 1 wherein at least some of the wheels are arranged to be selectively disengaged from the turbine during operation thereof.

7. The device according to claim 6 wherein said some of the wheels are arranged to be disengaged from the turbine in response to reduced wind speed.

8. The device according to claim 1 wherein there is provided an annular member arranged to be supported on the turbine for rotation therewith upon which said at least one wheel is arranged to be engaged, the annular member having a surface with a high coefficient of friction.

9. The device according to claim 1 wherein each wheel is rotatably supported on an inner side of a peripheral wall of the base and each wheel communicates through a respective opening in the peripheral wall spaced below an upper edge of the peripheral wall such that the wheel is in rolling engagement with a collar portion of the turbine which overlaps the peripheral wall of the base about a full periphery of the base.

10. The device according to claim 9 wherein:
 the coupling mechanism comprises a generator control associated with each generator; and
 each generator control operates the respective generator between an engaged position in which the respective wheel engages the ventilating turbine such that rotation of the turbine relative to the base drives rotation of the respective generator and a disengaged position in which the respective generator is disengaged from being driven by rotation of the turbine relative to the base.

11. The device according to claim 10 wherein the generator controls independently operate the respective generators between the engaged and disengaged positions thereof responsive to wind force as measured by a wind force gauge.

12. The device according to claim 11 wherein the generator controls are arranged to engage the respective generators into the engaged position sequentially with increasing wind force as measured by the wind force gauge.

* * * * *